United States Patent
Tomita et al.

(10) Patent No.: US 7,252,477 B2
(45) Date of Patent: Aug. 7, 2007

(54) ROTATING BLADE BODY

(75) Inventors: Yasuoki Tomita, Takasago (JP); Kouji Watanabe, Takasago (JP); Masamitsu Okuzono, Takasago (JP); Masaki Ono, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/340,510

(22) Filed: Jan. 27, 2006

(65) Prior Publication Data
US 2006/0177312 A1 Aug. 10, 2006

(30) Foreign Application Priority Data
Feb. 4, 2005 (JP) ............... 2005-028542

(51) Int. Cl.
*F01D 11/00* (2006.01)
(52) U.S. Cl. ............... 416/193 A; 416/145; 416/248; 416/500
(58) Field of Classification Search ......... 416/144, 416/145, 190, 191, 193 A, 220 R, 248, 500
See application file for complete search history.

(56) References Cited

U.S. PATENT DOCUMENTS 2,912,223 A 11/1959 Hull, Jr.
4,088,421 A * 5/1978 Hoeft ............... 416/193 A
2006/0110255 A1* 5/2006 Itzel et al. ............ 416/193 A

FOREIGN PATENT DOCUMENTS

| DE | 1090231 | 10/1960 |
|----|---------|---------|
| JP | 7-305602 | 11/1995 |
| JP | 09-303107 A | 11/1997 |
| SU | 418618 A * | 8/1974 |

* cited by examiner

*Primary Examiner*—Edward K. Look
*Assistant Examiner*—Dwayne J White
(74) *Attorney, Agent, or Firm*—Westerman, Hattori, Daniels & Adrian, LLP.

(57) ABSTRACT

A rotating blade body is provided that can restrain vibrations of rotating blades effectively. The rotating blade body comprises a rotor disc, a plurality of rotating blades being assembled so as to extend from the outer circumference of the rotor disc in a radial pattern, and sealing pins extending along the direction of the rotating shaft in the gaps between the platforms of the rotating blades being adjacent in a circumferential direction. The sealing pins have a through-hole made therein, penetrating axially from one end surface to the other end surface.

5 Claims, 6 Drawing Sheets

ROTATING BLADE BODY

The present invention is based on the Japanese Patent Application No. 2005-028542 filed on Feb. 4, 2005.

BACKGROUND OF THE INVENTION

1. Field of the Invention

The present invention relates to a rotating blade body which is mounted to a turbine part of a gas turbine, a steam turbine, a jet engine and the like or mounted to an air compressor of a gas turbine and a jet engine and rotates with a main shaft in an integrated manner.

2. Description of the Prior Art

Generally, in a turbine part of a gas turbine and the like and in an air compressor, a main shaft is installed inside a casing constructing an outer shape so as to rotate against the casing. Rotor discs are installed to this main shaft in a plurality of stages axially, and a plurality of rotating blades are extending from the outer circumference of each of the rotor discs in a radial pattern. These rotor discs and rotating blades constitute a rotating blade body, which rotates together with the main shaft in an integrated manner. Additionally, stationary vanes are installed to the casing along the main shaft so as to be arranged in a manner of alternating with the rotating blades.

In a case of a gas turbine, in such a turbine part constructed as described hereinabove, high temperature and high pressure combustion gas is supplied from a combustor as a working fluid, and by having this combustion gas flow through the rotating blades and the stationary vanes alternately, the main shaft is rotary driven together with the rotating blades, namely with a rotating blade body. Then, when a generator is connected to an edge of the main shaft, turning force of the main shaft is utilized as a source of electric power generation. On the contrary, when an injection port for exhaust of combustion gas is installed at an end of the turbine part, turning force of the main shaft is utilized as a jet engine. In a case of a steam turbine, by having high pressure steam flow through the rotating blades and the stationary vanes alternately as a working fluid, the main shaft is rotary driven, and turning force of the main shaft is utilized as a source of electric power generation of a generator.

On the other hand, in an air compressor of a gas turbine, a rotating blade body rotates together with a main shaft by rotation of the main shaft. By this, the air is inhaled from the outside as a working fluid and supplied to a combustor, being compressed by way of the rotating blades and the stationary vanes alternately. Here, compressed air being introduced into a combustor is burned with a fuel being supplied, resulting in high temperature and high pressure combustion gas, which is to be supplied to a turbine part of the above-mentioned gas turbine.

Figure 6:
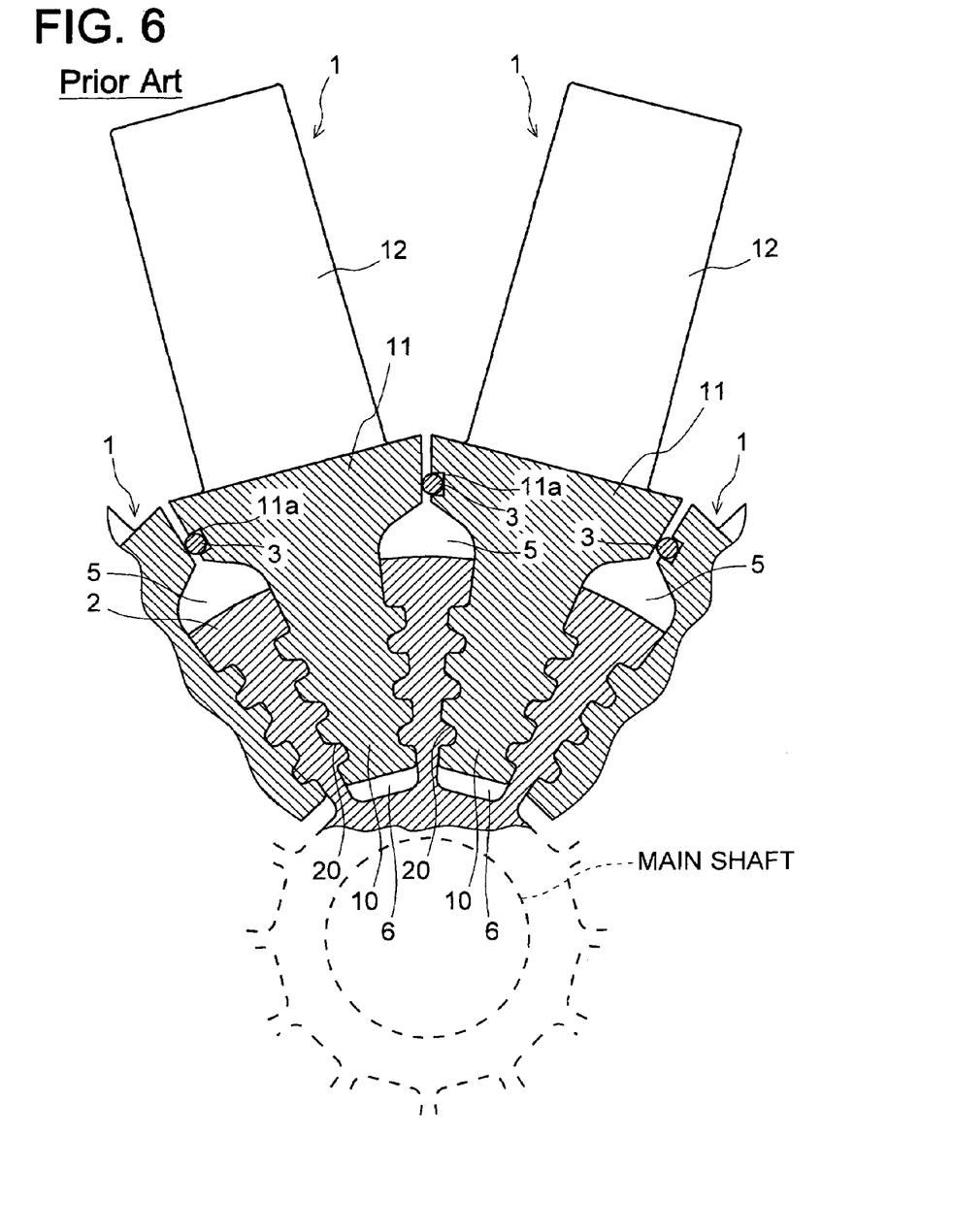
FIG. 6 is a longitudinal cross-sectional view showing necessary portions of a conventional rotating blade body, viewed in the direction of the rotating shaft.

Here, a rotating blade body consists of rotor disc and rotating blades that are manufactured independently, being constructed in a manner that the rotating blades are assembled to the rotor disc. For example, as shown in FIG. 6, rotating blades 1 mainly have a blade root portion 10, a platform portion 11 and a blade portion 12, sequentially from the side of the center of the rotating shaft of the rotating blade body.

The blade root portion 10 is a portion which has a shape of cross section thereof viewed in the direction of the rotating shaft formed to be just like a Christmas tree and fits into an after-mentioned blade-inserted groove 20 in a rotor disc 2, functioning to support the whole of the rotating blade 1 against the rotor disc 2. The platform portion 11 is a portion serving as a pedestal which connects the blade root portion 10 to the blade portion 12, covering the outer circumference of the rotor disc 2. The blade portion 12 is a portion which has a transverse plane thereof shaped to be streamlined, extends, being gradually twisted while maintaining the streamline shape, and functions so as to have fluid such as a combustion gas, high pressure steam or air flow smoothly.

On the other hand, on the marginal part of the outer circumference of the rotor disc 2, blade-inserted grooves 20 being shaped to be approximately the same as the cross-sectional shape of the blade root portion 10 of the rotating blade 1 are formed along the rotating shaft at regular intervals in a circumferential direction. Into each of these blade-inserted grooves 20, the blade root portion 10 of the rotating blade 1 is inserted from the direction of the rotating shaft and engaged. In this way, each of the rotating blades 1 is assembled to the rotor disc 2, so as to obtain a rotating blade body in which a plurality of rotating blades 1 extend from the outer circumference of the rotor disc 2 in a radial pattern.

Especially, in a case of a rotating blade body which is to be mounted to a turbine part of a gas turbine and the like, because the blade portions 12 are exposed to high temperature atmosphere by high temperature working fluid, an ingenuity is exercised in order to restrain an excessive increase in temperature of the rotating blades 1 themselves being caused by the aforementioned exposure. (For example, see the Japanese Patent Application Laid-Open No. H07-305602.) To be more precise, the outer circumference surface of the rotor disc 2 and the portions from the platform portions 11 and 11 of the rotating blades 1 and 1 being in circumferential direction to the roots of the blade root portions 10 and 10 form circulation spaces 5 along the direction of the rotating shaft in order to have a cooling fluid (an air, for example) circulate therein. By having the cooling fluid circulate in these circulation spaces 5, heat exchange is exercised directly between the rotating blades 1 and the circulation spaces 5, which results in cooling of the rotating blades 1 themselves, thereby restraining the increase in temperature.

Figure 7A:
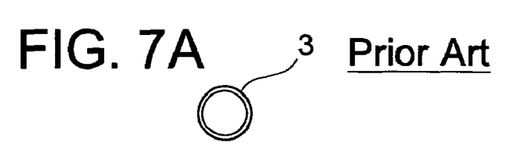
FIG. 7A is an outline view depicting a sealing pin in a conventional rotating blade body, showing a top plan view seen toward the end surface.
Figure 7B:
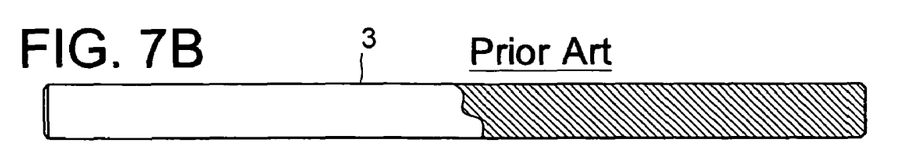
FIG. 7B is an outline view depicting a sealing pin in a conventional rotating blade body, showing a top plan view including a part of a cross-sectional view seen toward the side surface.

However, when excessive combustion gas leaks out into the circulation spaces 5 through the gaps between the adjacent platform portions 11 and 11, output to be obtained in the turbine part will be significantly deteriorated. Therefore, a sealing construction is provided so as to prevent excessive leakage of the combustion gas. To be more precise, as shown in FIG. 6, FIG. 7A and FIG. 7B, one of the end surfaces of the platforms 11 and 11 facing each other in circumferential direction with a space left between there has a sealing-pin-inserted groove 11a formed along the direction of the rotating shaft; wherein a sealing pin 3 being a column-shaped solid axle is inserted into the sealing-pin-inserted groove 11a. The sealing pin 3 is extending along the direction of the rotating shaft and is in contact with an end surface of the other platform portion 11, exercising sealing function to prevent the combustion gas from leaking out.

In addition, in the blade-inserted grooves 20 in the rotor disc 2, only the portions serving as the bottoms are widened largely toward the edges of the blade root portions 10 of the rotating blades 1, and the edges of the blade root portions 10 and the bottom portions of the blade-inserted grooves 20 form circulation spaces 6 along the direction of the rotating shaft in order to circulate a cooling fluid which is different from the above-mentioned cooling fluid. This construction is employed for a case where the rotating blades 1 are hollow rotating blades, in other words, for a case where flow passageways are formed inside the rotating blades 1 from the edges of the blade root portions 10 to the side surfaces and tips of the blade portions 12. The cooling fluid circulating in the circulation spaces 6 is introduced to the flow passageways inside the rotating blades 1 from the inlets which open at the edges of the blade root portions 10, exercises heat exchange with the rotating blades 1 while circulating through the flow passageways, and subsequently, is discharged through the outlets which open at the side surfaces and edges of the blade portions 12. The rotating blades 1 are cooled from the inside in the manner as described hereinabove. Incidentally, the cooling fluid being discharged from the side surfaces of the blade portions 12 becomes a film fluid which flows, covering the surfaces of the blade portions 12, and this film fluid provides a thermal insulation effect from the working fluid.

And now, the sealing pins 3 are expected to have a damping function, which is not known exactly but damps vibrations being caused to the rotating blades 1, in addition to the sealing function that prevents combustion gas from leaking out into the circulation spaces 5 being formed by the rotating blades 1 and 1 that are adjacent in circumferential direction. To put it plainly, because each of the rotating blades 1 is supported to the rotor disc 2 by having the blade root portion 10 thereof inserted into the blade-inserted groove 20 in the rotor disc 2 to be fit in, the platform portion 11 and the blade portion 12 will be in such a condition respectively as will vibrate in the circumferential direction with the blade root portion 10 serving as a supporting point independently while rotating together with the main shaft during operation. However, because the adjoining rotating blades 1 are bound by having the sealing pins 3 intervene at the platform portions 11 thereof, a damping force due to existence of the sealing pins 3 acts on the rotating blades 1, so that the vibrations come to be damped.

However, although the above-mentioned general sealing pins 3 of solid axle are expected to provide a damping effect, on the contrary, due to an increase in natural frequencies of the rotating blades 1 themselves, vibrations being caused to the rotating blades 1 during steady operation, resonance, and the like, adverse effects on restraining of the vibrations of the rotating blades 1 arose as a result. Therefore, accurate judgment could not be made.

SUMMARY OF THE INVENTION

It is an object of the present invention to provide a rotating blade body that can restrain the vibrations of rotating blades effectively.

In order to achieve the above-mentioned object, in accordance with a preferred embodiment of the present invention, there is provided a rotating blade body comprising a rotor disc rotating with a main shaft in an integrated manner and a plurality of rotating blades being assembled so as to extend from the outer circumference of the rotor disc in a radial pattern; wherein, column-shaped sealing pins which extend along the direction of the rotating shaft are provided to the gaps between the platforms of the rotating blades being adjacent in circumferential direction, and the sealing pins have hole made therein. By this, sealing function is exercised for the gaps between the platforms of the adjoining rotating blades, and at the same time, the weight of the sealing pins exercising a damping function for the rotating blades is reduced for the volume of the hole. As a result, the natural frequencies of the rotating blades themselves can be increased so as to exceed well over the resonance zone, so that the resonance of the rotating blades can be prevented. Especially, it is preferable that the ratio of the weight of the sealing pin having the hole made therein versus the weight of the sealing pin having no such hole is within the range between 40% and 90%.

Here, considering practicality, it is preferable that the hole penetrate from one end surface of the sealing pins to the other end thereof axially. In this case, in order to maintain the rigidity of the sealing pins, at least one of the both ends of the hole may be plugged.

In addition, the holes may radially penetrate through the circumference surfaces of the sealing pins at a plurality of locations.

In the rotating blade body in accordance with the present invention, because sealing function and damping function can be achieved by the sealing pins and in addition, because the natural frequency level of the rotating blades themselves can be increased so much as to exceed well over the resonance zone, the resonance of the rotating blades can be prevented, thereby achieving effective restraint of the vibrations.

DESCRIPTION OF THE PREFERRED EMBODIMENTS

Figure 1:
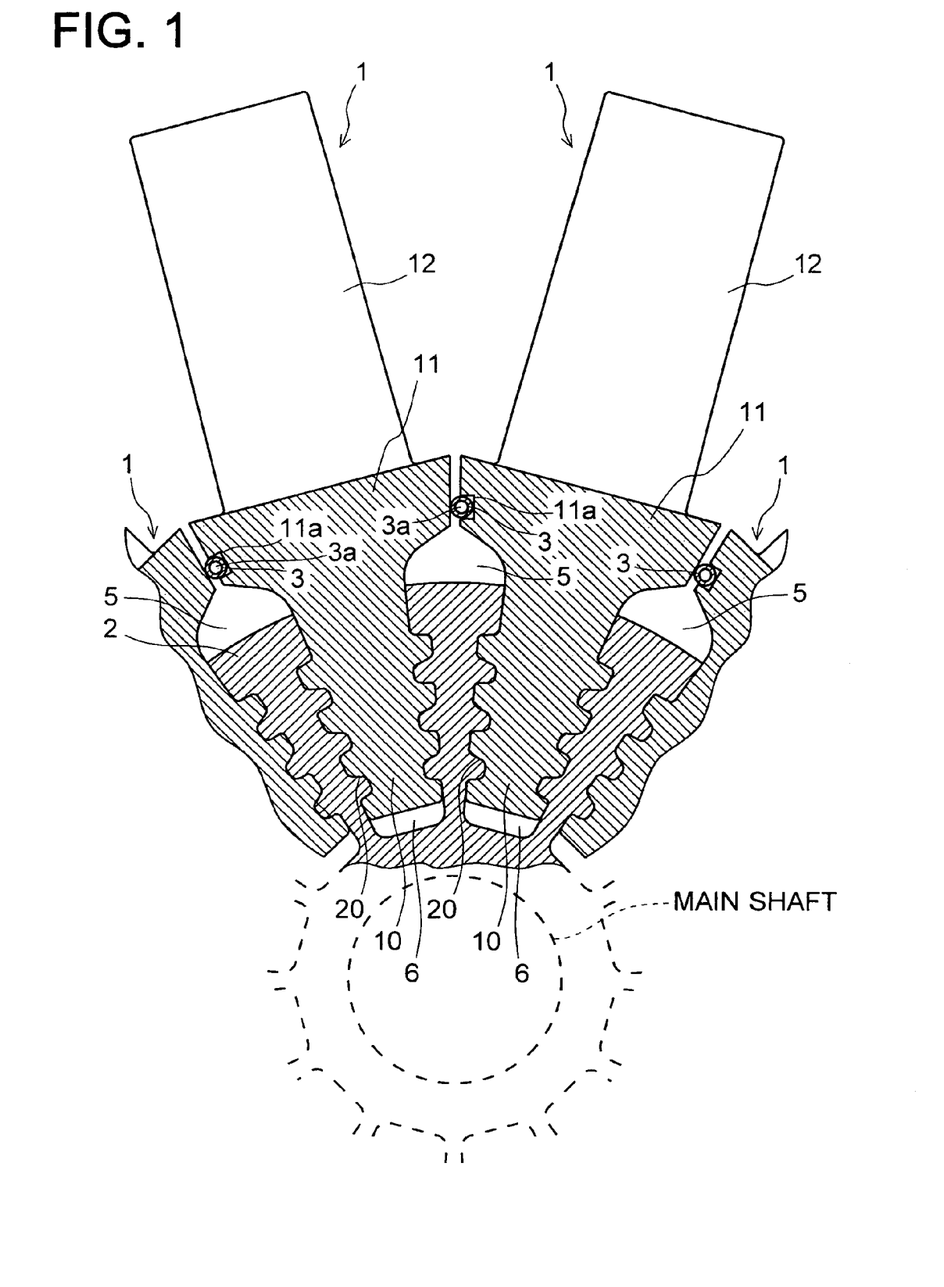
FIG. 1 is a longitudinal cross-sectional view showing necessary portions of a rotating blade body in accordance with a first embodiment of the present invention, viewed in the direction of the rotating shaft.
Figure 2A:
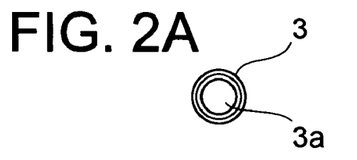
FIG. 2A is an outline view depicting a sealing pin in the rotating blade body in accordance with the first embodiment, showing a top plan view seen toward the end surface.
Figure 2B:
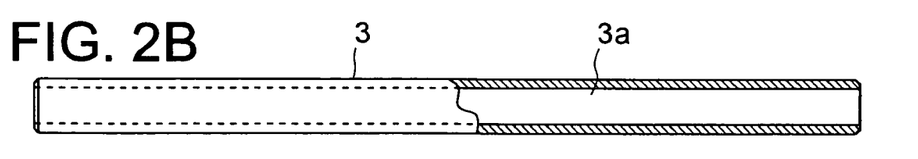
FIG. 2B is an outline view depicting a sealing pin in the rotating blade body in accordance with the first embodiment, showing a top plan view including a part of a cross-sectional view seen toward the side surface.

Referring now to the drawings, embodiments of the present invention will be described hereinafter. First, a rotating blade body in accordance with a first embodiment of the present invention will be described. FIG. 1 is a cross-sectional view showing necessary portions of a rotating blade body in accordance with a first embodiment, viewed in the direction of the rotating shaft. FIG. 2A and FIG. 2B are outline views of a sealing pin in the rotating blade body, wherein FIG. 2A is a top plan view seen toward the end surface thereof, while FIG. 2B is a top plan view including a part of a cross-sectional view seen toward the side surface. In these figures, same symbols will be provided to the portions having the same names as shown in FIG. 6, FIG. 7A and FIG. 7B, and overlapping description will be omitted. This will be also applicable to second and third embodiments of the present invention that are to be described hereinafter.

As shown in FIG. 1, a rotating blade body in accordance with this embodiment consists of rotor disc 2, rotating blades 1 and sealing pins 3, which are manufactured individually. A sealing pin 3 is inserted into a sealing-pin-inserted groove 11a in a platform portion 11 of each of the rotating blades 1, and by inserting a blade root portion 10 of each of the rotating blades 1 into a blade-inserted groove 20 in the rotor disc 2 to be fit therein, the whole is assembled.

Here, as shown in FIG. 1, FIG. 2A and FIG. 2B, the sealing pins 3 in accordance with the embodiment are column-shaped members, extending along the direction of the rotating shaft of the rotating blade body in the gaps between the platform portions 11 and 11 of the adjoining rotating blades 1 and 1 and have a through-hole 3a made therein which penetrates from one end surface to the other end surface axially. To put it plainly, the sealing pins 3 in accordance with this embodiment are virtually tube-shaped. Manufacturing of sealing pins having such a through-hole 3a as described hereinabove can be easily exercised, for example, by boring a material pipe which is cut out for a predetermined length from a pipe member serving as a material.

When the rotating blade body is mounted to a turbine part of a gas turbine, same as the material of the rotating blades 1, Ni(Nickel)-base alloy or Co(Cobalt)-base alloy, for example, is suitable for the material of the sealing pins 3. However, the material may be selected accordingly, depending on an object to which the rotating blade body is to be installed.

In accordance with the rotating blade body constructed as described hereinabove, the weight of the sealing pins 3 is reduced for the amount of volume of the through-holes 3a, which, consequently, can increase the natural frequency level of the rotating blades 1 themselves so much as to exceed well over the resonance zone. This is because the natural frequencies of the rotating blades 1 themselves are inversely proportional to the square root of the weight of the sealing pins 3, so that the smaller the weight of the sealing pins 3 is, the higher the natural frequency level of the rotating blades 1 becomes. As a result, resonance of the rotating blades 1 can be prevented, thereby making it possible to restrain the vibrations effectively. Of course, the sealing pins 3 can ensure sufficient rigidity in spite of having such a through-hole 3a therein as described hereinabove. Therefore, sealing function is achieved for the gaps between the platform portions 11 and 11 of the adjoining rotating blades 1 and 1 as well as damping function is achieved for the rotating blades 1.

However, it is important to select the diameter of the through-holes 3a for the diameter of the sealing pins 3 in order that the natural frequency level of the rotating blades 1 is out of the resonance zone while the sealing function and the damping function of the sealing pins 3 are ensured.

Figure 3A:
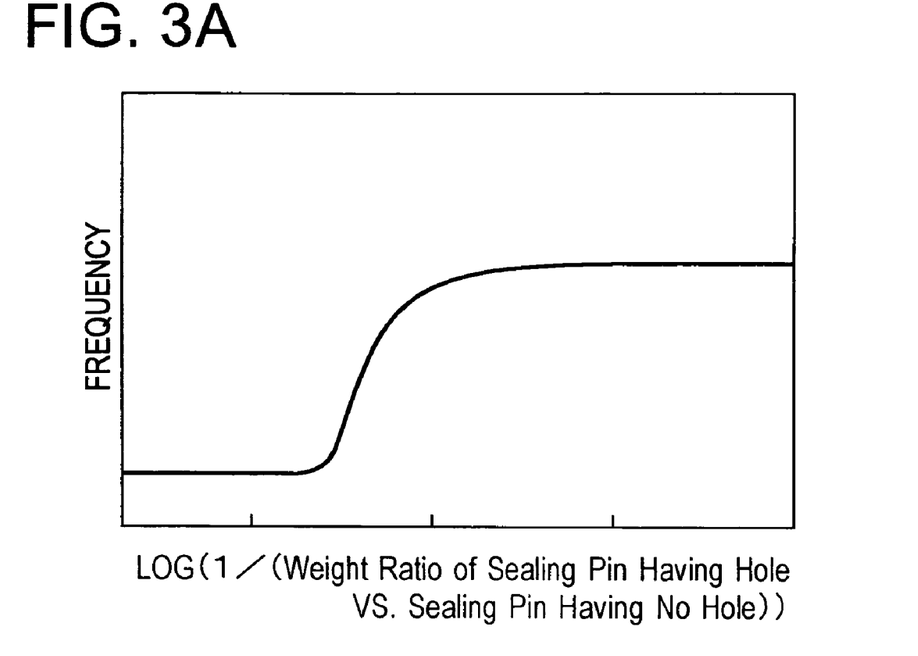
FIG. 3A and FIG. 3B are correlation diagrams showing one example of effects of vibrations supplied by mitigation of the weight of the sealing pins in accordance with the first embodiment.
Figure 3B:
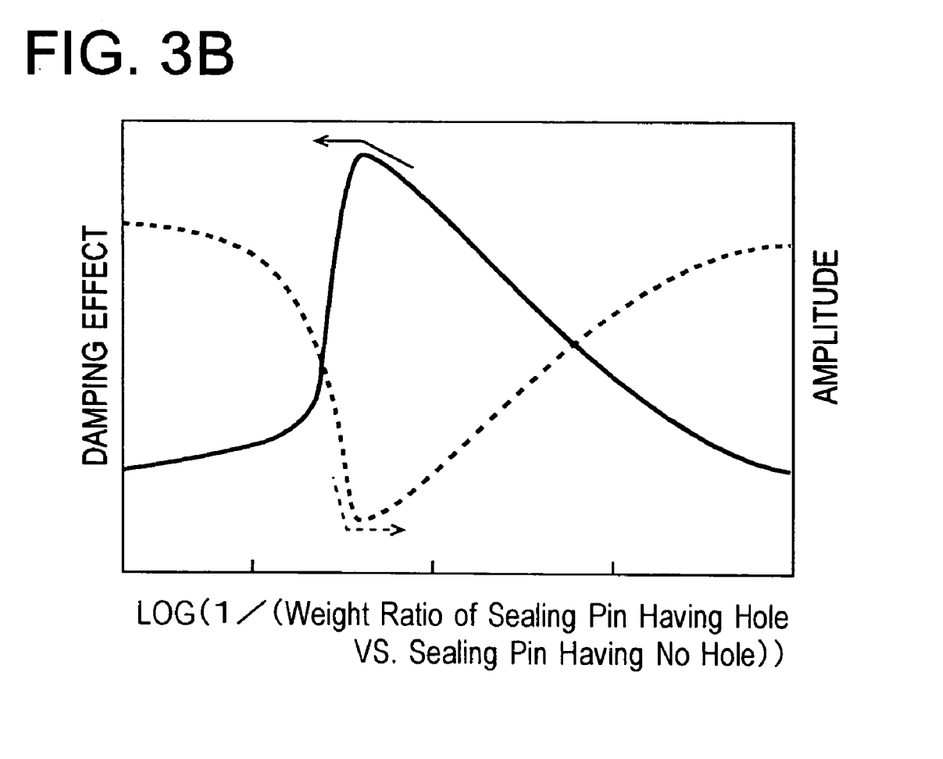

To put it plainly, as shown in FIG. 3A and FIG. 3B, by studying the effects of mitigation of the weight of the sealing pins (by having a through-hole 3a formed therein) on vibrations, it was discovered that even sealing pins 3 having the same outside dimensions gave effects on the vibrations of the rotating blades 1 by reducing the weight thereof (moving from the point "1" on the axis of abscissas in FIG. 3A and FIG. 3B, which is the point to show the solid axle serving as a reference having no through-hole 3a, to the right side). Because the tolerance of the sealing pins 3 is obtained by the relation between the size of the rotating blade 1 and the sealing-pin-inserted groove 11a, the sealing pins 3 cannot be made extremely slender. However, in case of sealing pins 3 having the same outside dimensions, the characteristic number of the frequencies of the rotating blades increases when the weight is reduced, and can be brought into the zone where no resonance occurs by selecting appropriate reduction of the weight of the sealing pins 3. (See FIG. 3A.) Additionally, by reducing the weight of the sealing pins 3, the range of the damping effect on the vibrations of the rotating blades can be grasped precisely. (See FIG. 3B.) Based on these results, transfer to implementation of the present invention could be backed up by simulation. Moreover, considering the relations shown in FIG. 3A and FIG. 3B and the strength of the sealing pin 3, it is preferable that the ratio of the weight of the sealing pin 3 having a through-hole 3a formed therein versus the weight of sealing pin being solid axle and serving as a reference having no through-hole 3a is within the range between 40% and 90%.

Figure 4A:
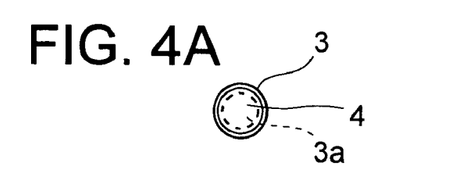
FIG. 4A is an outline view depicting a sealing pin in a rotating blade body in accordance with a second embodiment of the present invention, showing a top plan view seen toward the end surface.
Figure 4B:
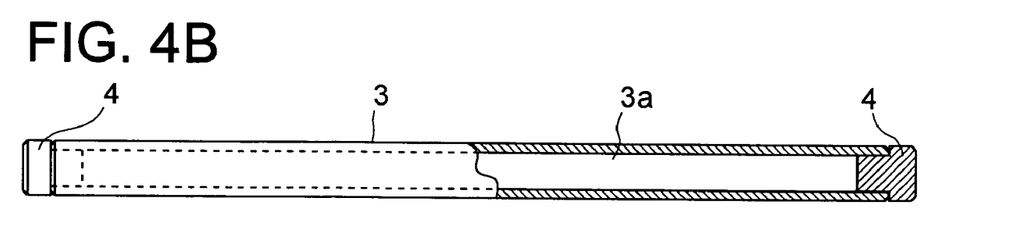
FIG. 4B is an outline view depicting a sealing pin in the rotating blade body in accordance with the second embodiment, showing a top plan view including a part of a cross-sectional view seen toward the side surface.

Next, a second embodiment in accordance with the present invention will be described hereinafter by referring to FIG. 4A and FIG. 4B. FIG. 4A and FIG. 4B are outline views of a sealing pin in the rotating blade body in accordance with the second embodiment, wherein FIG. 4A is a top plan view seen toward the end surface, while FIG. 4B is a top plan view including a part of a cross-sectional view seen toward the side surface. The second embodiment is characterized by contriving to enhance the rigidity of the sealing pins 3 in accordance with the first embodiment effectively so as to ensure the sealing function and the damping function thereof.

To put it plainly, as shown in FIG. 4A and FIG. 4B, the sealing pins 3 in accordance with this embodiment have a through-hole 3a made therein in the same manner as the sealing pins in accordance with the first embodiment described hereinabove, but both ends of the through-hole 3a are filled in with plug members 4. By this, radial deformation of the sealing pins 3 is restrained by the plug members 4, thereby enhancing the rigidity of the sealing pins 3, which results in assurance of the sealing function and the damping function of the sealing pins 3.

Installation of the plug members 4 to both ends of the through-holes 3a in such a manner as described hereinabove can be easily executed by caulking, screwing and welding.

In addition, the plug members 4 may be installed to only one of both ends of the through-holes 3a, because the rigidity of the sealing pins 3 can be expected to be enhanced in spite of plugging of only one end.

Figure 5A:
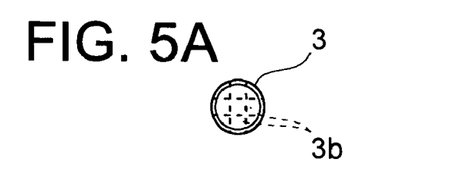
FIG. 5A is an outline view depicting a sealing pin in a rotating blade body in accordance with a third embodiment, showing a top plan view seen toward the end surface.
Figure 5B:
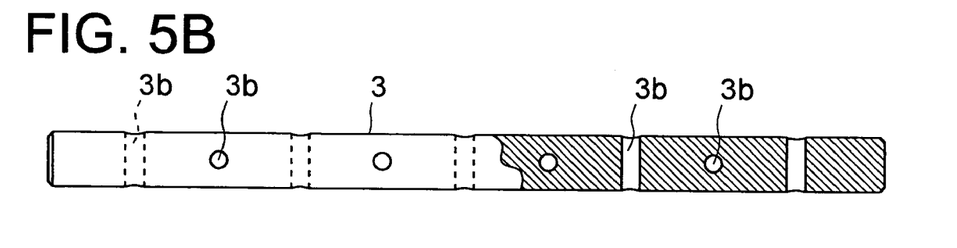
FIG. 5B is an outline view depicting a sealing pin in the rotating blade body in accordance with the third embodiment, showing a top plan view including a part of a cross-sectional view seen toward the side surface.

Next, a third embodiment in accordance with the present invention will be described hereinafter by referring to FIG. 5A and FIG. 5B. FIG. 5A and FIG. 5B are outline views of a sealing pin in the rotating blade body in accordance with the third embodiment, wherein FIG. 5A is a top plan view seen toward the end surface, while FIG. 5B is a top plan view including a part of a cross-sectional view seen toward the side surface. The third embodiment is characterized by modifying the arrangement aspect to provide a through-hole $3a$ in the sealing pin 3 in accordance with the first embodiment.

To put it plainly, as shown in FIG. 5A and FIG. 5B, the sealing pins 3 in accordance with this embodiment have through-holes $3b$ radially penetrating the circumference surface at a plurality of locations, being spaced axially at predetermined intervals from one end to the other end, in place of the through-holes $3a$ in accordance with the first embodiment. Each of the through-holes $3b$ here is provided in such an arrangement aspect as to deviate sequentially for 90 degrees for each in circumferential direction, being axially viewed. Manufacturing of the sealing pins 3 having such through-holes $3b$ as described hereinabove can be easily executed by drilling holes into the material shaft which is cut out for a predetermined length from a shaft member serving as a material.

Constructed as described hereinabove, the weight of the sealing pins 3 is reduced for the amount of volume of the through-holes $3b$, which results in increasing the natural frequencies of the rotating blades 1 themselves so much as to exceed well over the resonance zone, thereby preventing the resonance of the rotating blades 1 and making it possible to restrain the vibrations effectively. Especially, sealing pins 3 having such through-holes $3b$ as described hereinabove scarcely have a change in the rigidity of the sealing pins 3, so that the sealing function and the damping function thereof can be effectively achieved for the gaps between the platforms 11 and 11 of the adjoining rotating blades 1 and 1.

However, it is important to select the diameter and the quantity of the through-holes $3b$ in order that the natural frequency level of the rotating blades 1 is out of the resonance zone while the sealing function and the damping function of the sealing pins 3 are ensured.

Additionally, the through-holes $3b$ may be arranged so as to deviate sequentially for 30 degrees in the arrangement aspect being axially viewed. Of course, the through-holes $3b$ may deviate for irregular angle or may have no deviation; and moreover, may penetrate diagonally through the circumference surface.

While the present invention has been described with what is presently considered to be the most practical and preferred embodiment, it is to be understood that the invention is not limited to the disclosed embodiments as mentioned hereinabove, but on the contrary, is intended to cover various modifications and equivalent arrangements included within the spirit and scope of the appended claims. For example, in the first and the third embodiments, sealing pins 3 have a through-hole $3a$ or through-holes $3b$ penetrate therein, but as long as the weight of the sealing pins 3 can be mitigated, the holes may not penetrate entirely through but penetrate through halfway.

As described hereinabove, obviously, it is possible to provide the present invention with various modifications and deformations. Therefore, it is understood that the present invention will be executed within the scope of the appended claims without sticking to concrete description.

What is claimed is:

1. A rotating blade body comprising a rotor disc rotating with a main shaft in an integrated manner and a plurality of rotating blades being assembled so as to extend from an outer circumference of the rotor disc in a radial pattern:

wherein a column-shaped sealing pin that extends along the direction of the shaft is provided in each gap between platforms of rotating blades being adjacent in the circumferential direction, wherein the sealing pin comprises a circular hole formed therethrough to penetrate in an axial direction from one end face of the sealing pin to another end face of the sealing pin; and wherein the sealing pin having the hole formed therethrough is formed by boring a tubular or cylindrical member, the sealing pin being solid except where the hole is formed and being seamless in the axial direction.

2. A rotating blade body as described in claim 1, wherein, the ratio of weight of the sealing pin that has the hole provided thereto versus weight of a sealing pin that does not have the hole is within a range between 40% and 90%.

3. The rotating blade body as described in claim 1, wherein, at least one of both ends of the holes is plugged.

4. The rotating blade body as described in claim 1, wherein the sealing pins are formed of a same material as the rotating blades.

5. The rotating blade body as described in claim 1, wherein, as a result of the sealing pins having the hole formed therethrough, a natural frequency of the rotating blades is so adjusted as to be out of a resonance zone.

* * * * *